US009235494B2

(12) United States Patent
Gautam

(10) Patent No.: US 9,235,494 B2
(45) Date of Patent: Jan. 12, 2016

(54) AUTOMATED CODE ANALYZER

(71) Applicant: Syntel, Inc., Troy, MI (US)

(72) Inventor: Ritesh Gautam, Mumbai (IN)

(73) Assignee: Syntel, Inc., Troy, MI (US)

(*) Notice: Subject to any disclaimer, the term of this patent is extended or adjusted under 35 U.S.C. 154(b) by 0 days.

(21) Appl. No.: 14/213,429

(22) Filed: Mar. 14, 2014

(65) Prior Publication Data
US 2014/0282445 A1 Sep. 18, 2014

Related U.S. Application Data

(60) Provisional application No. 61/781,267, filed on Mar. 14, 2013.

(51) Int. Cl.
  *G06F 9/45* (2006.01)
  *G06F 11/36* (2006.01)

(52) U.S. Cl.
  CPC .................. *G06F 11/3616* (2013.01)

(58) Field of Classification Search
  USPC ......................................................... 717/143
  See application file for complete search history.

(56) References Cited

U.S. PATENT DOCUMENTS

| | | | | |
|---|---|---|---|---|
| 5,659,753 A * | 8/1997 | Murphy | ................... | G06F 8/433 717/143 |
| 6,275,223 B1 * | 8/2001 | Hughes | ................. | G06F 3/0483 715/751 |
| 6,799,718 B2 * | 10/2004 | Chan | ......................... | G06F 8/33 235/375 |
| 7,340,726 B1 * | 3/2008 | Chelf | ........................ | G06F 8/71 714/38.12 |
| 2003/0028364 A1 * | 2/2003 | Chan et al. | ......................... | 704/1 |
| 2009/0138843 A1 * | 5/2009 | Hinton et al. | .................. | 717/101 |
| 2009/0144698 A1 * | 6/2009 | Fanning et al. | ............... | 717/120 |
| 2010/0095277 A1 * | 4/2010 | Cheng et al. | .................. | 717/127 |
| 2011/0022551 A1 * | 1/2011 | Dixon | ............................. | 706/12 |
| 2011/0067009 A1 * | 3/2011 | Hosokawa et al. | ........... | 717/132 |
| 2012/0174061 A1 * | 7/2012 | McCollum | ................ | G06F 8/33 717/106 |
| 2013/0055205 A1 * | 2/2013 | Sereni | ....................... | G06F 8/75 717/124 |
| 2013/0290205 A1 * | 10/2013 | Bonmassar et al. | .......... | 705/321 |
| 2014/0282373 A1 * | 9/2014 | Garza | ....................... | G06F 8/74 717/106 |
| 2014/0282445 A1 * | 9/2014 | Gautam | ........................ | 717/143 |

OTHER PUBLICATIONS

Jay et al., "Cyclomatic Complexity and Lines of Code: Empirical Evidence of a Stable Linear Relationship", J. Software Engineering & Applications, 2009, 2: 137-143.*
Halloran et al. "High Quality and Open Source Software Practices", 2002, retrieved from <http://flosshub.org/sites/flosshub.org/files/HalloranScherlis.pdf> pp. 3.*

(Continued)

*Primary Examiner* — Marina Lee
(74) *Attorney, Agent, or Firm* — Dykema Gossett PLLC

(57) ABSTRACT

Systems, methods, and computer program products for analyzing source code are disclosed. The system includes a file reader module on a computer, a parser module on a computer, a metrics accumulator module, and a reporting engine on a computer. The file reader module may read an input source code file. The parser module may parse source code in the source code file into source code components. The metrics accumulator module may analyze the source code components in accordance with one or more rules to generate application metadata. The reporting engine may use the generated application metadata to generate a report of the analysis.

18 Claims, 2 Drawing Sheets

(56) References Cited

OTHER PUBLICATIONS

"Micro Focus Enterprise Analyzer" available at http://www.microfocus.com/products/enterprise-analyzer/enterprise-analyzer/index.aspx (retrieved Apr. 9, 2015).

"Cast Application Analytics Dashboard" available at http://www.castsoftware.com/products/application-analytics-dashboard?GAD-SEOI (retrieved Apr. 9, 2015).

"Smarter Outsourcing for SI and Client" available at http://www.microfocus.com/ (retrieved Apr. 9, 2015).

"ASG Effective Application Management" available at http://www.asg.com/Portfolio/Systems/APPLICATION-MANAGEMENT.aspx (retrieved Apr. 9, 2015).

"ASG Smart Catalog" available at http://www.asg.com/smart-catalog/asg-viewdirect.aspx (retrieved Apr. 9, 2015).

"Business Rule Manager" available at http://www.microfocus.com/products/enterprise-analyzer/enterprise-analyzer/business-rule-manager.aspx (retrieved Apr. 9, 2015).

"Code Analysis Tools" available at http://www.castsoftware.com/products/code-analysis-tools (retrieved Apr. 9, 2015).

"Next Generation Approaches to Application Analysis" available at http://www.hathasystems.com/software-analysis-solutions.htm (retrieved Apr. 9, 2015).

"Data Migration and ETL" available at http://www.hathasystems.com/software-analysis-solutions-dmetl.htm (retrieved Apr. 9, 2015).

"Enterprise View" available at http://www.microfocus.com/products/enterprise-analyzer/enterprise-analyzer/enterprise-view.aspx (retrieved Apr. 9, 2015).

"Extracting System Knowledge to Manage Risk" available at http://www.hathasystems.com/ (retrieved Apr. 9, 2015).

"Improved Code Quality" available at http:/www.castsoftware.com/solutions/improve-code-quality/overview (retrieved Apr. 9, 2015).

"HTWC ICON" available at www.htwc.com/download/brochures/ICON-INFO-EN.pdf (retrieved Apr. 9, 2015).

"Re-Platforming" available http://www.hathasystems.com/software-analysis-solutions-replat.htm (retrieved Apr. 9, 2015).

"Prevent, Measure, Improve" available at http://www.castsoftware.com/Solutions (retrieved Apr. 9, 2015).

"Software Maintenance" available at http://www.hathasystems.com/software-analysis-solutions-maint.htm (retrieved Apr. 9, 2015).

"Visual Cobol: The Agent of Change" available at http://www.microfocus.com/downloads/visual-cobol-the-agent-of-change-211036.aspx (retrieved Apr. 9, 2015).

"Software Compliance" available at http://www.hathasystems.com/software-analysis-solutions-comp.htm (retrieved Apr. 9, 2015).

* cited by examiner

AUTOMATED CODE ANALYZER

CROSS-REFERENCE TO RELATED APPLICATIONS

This application claims priority to, and the benefit of, U.S. Provisional Application Ser. No. 61/781,267, filed Mar. 14, 2013 and entitled an "Automated Code Analyzer," the disclosure of which is incorporated herein by reference in its entirety.

TECHNICAL FIELD

This disclosure relates generally to computerized systems; in particular, this disclosure relates to computer systems programmed to analyze source code to determine various metrics about the source code.

BACKGROUND

Source code is a set of computer instructions written in a human-readable format. Source code is written in a computer programming language that can be executed by a processor after being compiled or interpreted into machine-readable instructions. There are circumstances in which analysis of source code for different metrics, such as size or complexity, can be useful. However, these can be difficult tasks to perform, particularly for an entire code repository. Therefore, there is a need for a tool that analyzes source code in an easier and more effective manner.

SUMMARY

This disclosure relates to an analysis tool in the form of an automated source code analyzer that parses source code for multiple computer programming languages and collects information about the source code as per the rules it is configured to execute. Data gathered by this tool can then be used for further analysis that may include, but should not be limited to, estimation of size, complexity and effort of maintaining an application, analysis of the code quality, adherence to coding standards, identifying areas of performance improvements within the code, and the like. Illustratively, the analysis tool can process source code for multiple languages, examples of which include, but are not limited to, COBOL, Java, C, C++, VB and .Net technologies. In one embodiment, the tool is integrated with a web-based platform, and a reporting feature of the tool can thus be used to deliver reports, in various formats, of the data generated by the tool to a wide variety of local and/or remote users.

This analysis tool may generally be used for a variety of purposes, examples of which include, but are not limited to, estimating the scope and effort required for projects, performing rule-based analysis of source code to assess code quality, identifying performance bottlenecks, and enabling analysis concerning total cost of ownership ideas. The tool is flexible in that it can be configured for multiple applications, such as metrics gathering, code quality checks, and the like, and can be easily integrated into quality/reliability processes for, e.g., early detection of code quality parameters. As compared with conventional manual source code analysis techniques, this tool significantly reduces the time required to ascertain program structure, execution flow, size and complexity of source code applications.

According to one aspect, a system for analyzing source code may comprise one or more computers; a file reader module on at least one of the one or more computers to read an input source code file containing source code written in at least one computer programming language; a parser module on at least one of the one or more computers and including a plurality of parsers each specific to a different computer programming language, the parser module to parse the source code in the input source code file into source code components based on syntax rules of the at least one computer programming language in which the source code is written; a metrics accumulator module on at least one of the one or more computers to analyze the source code components according to one or more rules to generate application metadata; and a reporting engine on at least one of the one or more computers to generate a report based on the generated application metadata.

According to another aspect, a computerized system for analyzing source code may comprise one or more computing devices including a processor, and a memory having instructions stored therein which, when executed by the processor, cause the processor to read an input source code file containing source code written in at least one computer programming language; parse the source code read from source code file into source code components; analyze the source code components in accordance with one or more rules to generate application metadata; and generate a report of the analysis from the generated application metadata.

In another aspect, a method of analyzing source code may comprise reading with at least one computer an input source code file containing source code written in at least one computer programming language; parsing with at least one computer the source code in the input source code file into source code components based on syntax rules of the at least one computer programming language in which the source code is written; analyzing with at least one computer the source code components according to one or more rules to generate application metadata; and generating with at least one computer a report based on the generated application metadata.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Figure 1:
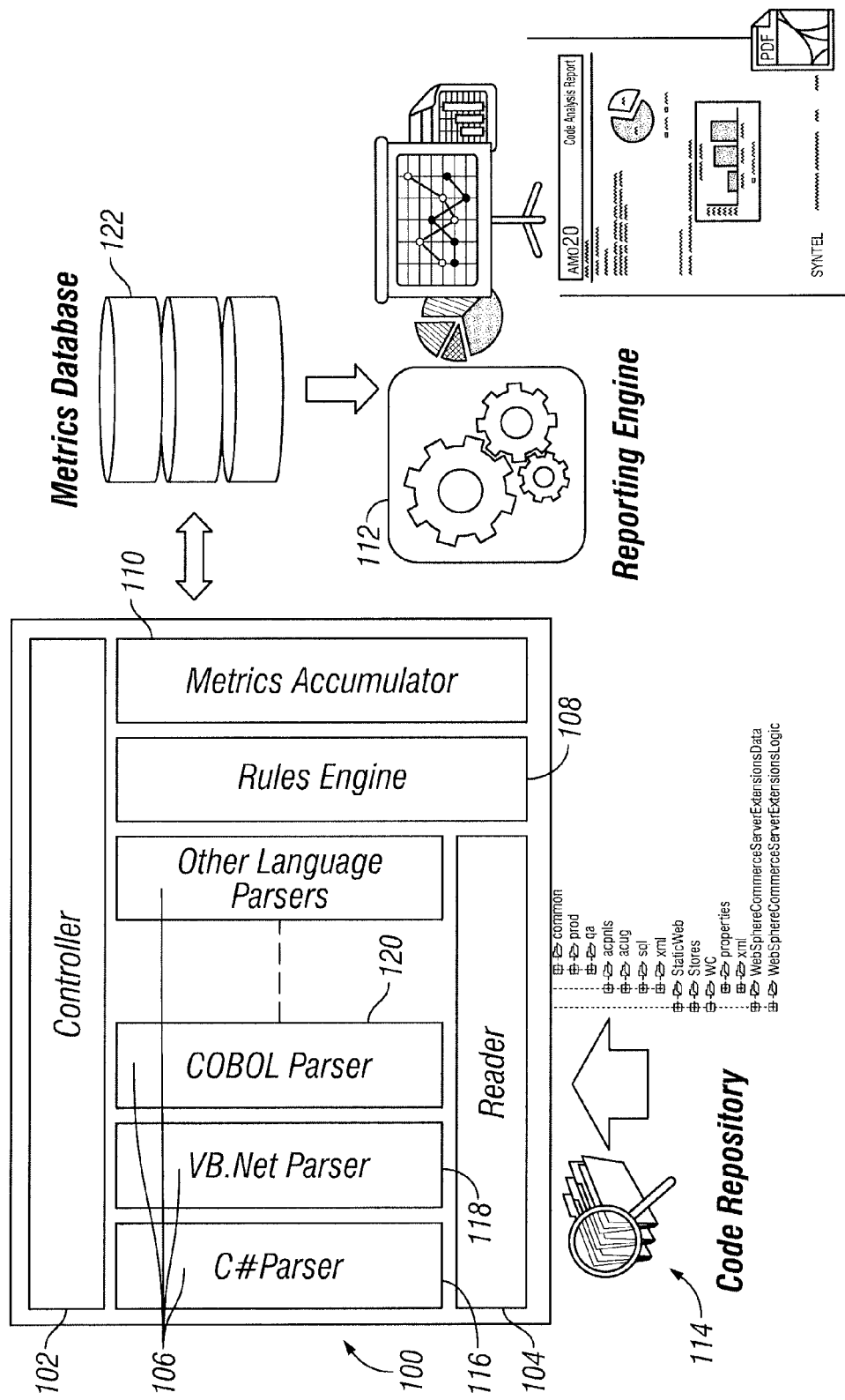
FIG. 1 is a block diagram showing an example architecture for the analysis tool.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure generally relates to a computerized system programmed with an analysis tool 100 that is configured to analyze source code for one or more computer programs to gather certain metrics associated with the source code. This reduces the time required to understand an application's program structure, execution flow, size and complexity. When performing a software portfolio accessment, for example, the analysis tool 100 could be used to analyze multiple programs to identify outsourcing opportunities, which could be a value add during the transition phase to another program and help understand the application's program structure and execution flow.

FIG. 1 shows an example system architecture that could be used for the analysis tool 100. In the example shown, the analysis tool 100 includes a controller module 102, a file reader module 104, a plurality of parser modules 106, a rules engine 108, a metrics accumulator module 110, and a reporting engine 112. The controller module 102 identifies the components required to be executed and controls the loading and execution of these components. The file reader module 104 reads input source code files, such as from a code repository 114, which may include source code for a plurality of different computer programs. The file reader module 104 tokenizes the source code and processes comments and compiler directives. The file reader module 104 works in conjunction with a parser module, which includes a plurality of parsers 106, to process source code(s) based on a computer language(s) of the source code(s) to be analyzed.

In the illustrated embodiment, the parser module includes a plurality of parsers 106. Each parser 106 is configured to process source code written in a different computer source code language such that each such computer language is handled by a different one of the parsers 106 specific to that computer source code language. In the illustrated embodiment, for example, the parser module includes a C# parser 116 that is configured specifically to parse source code written in the C# computer programming language, a VB.Net parser 118 that is configured specifically to parse source code written in the Visual Basic (VB.Net) computer programming language, a COBOL parser 120 that is configured specifically to parse source code written in the COBOL computer programming language and/or possibly one or more additional parsers. The parser module processes each source code file based on the syntax rules of its specific computer language, i.e., using the one of the plurality of parsers 106 that is configured to parse source code written in its specific computer language, and identifies various components of that language, such as variable declaration, classes, modules, methods, program constructs and statements. The parser uses various other components to compute metrics, resolve references and generate metadata for the application.

The rules engine 108 provides a set of rules for analyzing the source code. For example, the rules engine 108 may include a plurality of different rules for different types of analysis to be performed on the source code. In this manner, a user can select the type of analysis that is desired.

The metrics accumulator 110 generates the application metadata. The application's metadata can be used to generate various outputs required by the user. In some cases, the results of the analysis may be stored in a metrics database 122. The application metadata and information from the analysis stored in the metrics database 122 may be used by a reporting engine 112 to generate various types of assessment reports for the user. In some embodiments, the reports could be outputted in a format accessible by software development suites.

Figure 2:
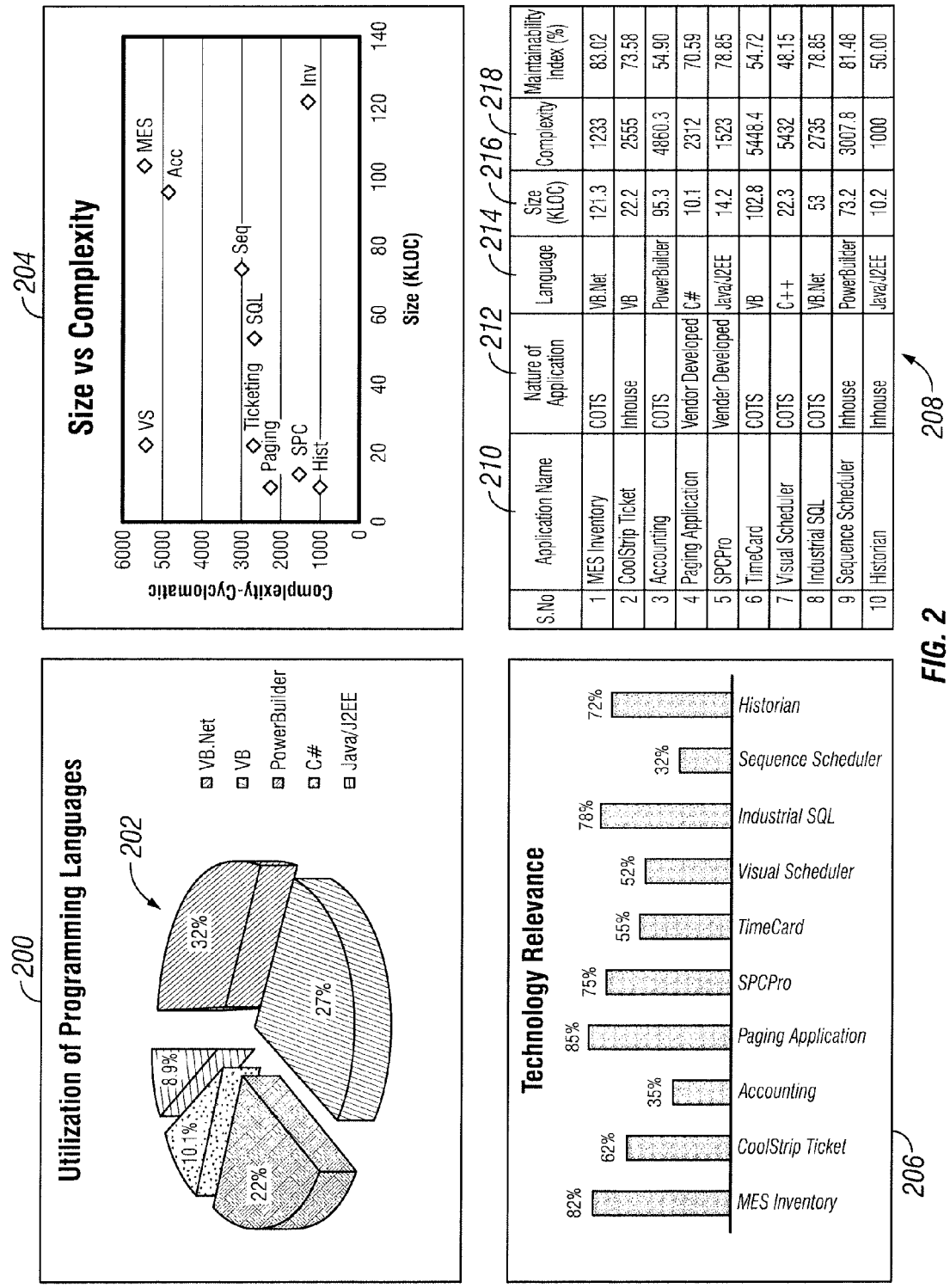
FIG. 2 shows various example reports that could be generated using the analysis tool.

FIG. 2 shows examples of some types of reports that can be generated by the reporting engine 112. A first report 200 is a pie chart showing an analysis of programming language utilization. In this example, the pie chart 202 shows the portion each programming language is used within the code repository that being analyzed. For example, the relative percentages could correspond to relative lines of code for a first programming language versus a second programming language, etc. Although a pie chart is used in this example, other types of charts could be used to show the relative programming language utilization.

A second report 204 is a plot of code size (in thousands of lines of code) versus code complexity (e.g., cyclomatic), which is a software metric related to conditional complexity in code, for various applications. Although the plot shown is size versus complexity for purposes of example, other metrics analyzed by the analysis tool 100 could be plotted.

A third report 206 is a bar graph showing the relative weight regarding technology relevance has been analyzed with various applications. Although a bar graph is used for purposes of example, this data could be represented in other forms. Likewise, the particular metric that is shown in this graph is merely for purposes of example and other types of metrics could be plotted.

A fourth chart 208 is a table showing various metrics for a plurality of applications. In this example, a first column 210 is a list with the name of a plurality of software applications. A second column 212 describes the nature of the application, such as whether the software was developed in-house, by a third party vendor or is off-the-shelf. A third column 214 describes the programming language in which the application is written. A fourth column 216 identifies the lines of code for each of the applications. A fifth column 218 identifies the level of complexity based on a complexity metric. A sixth column 220 identifies a metric regarding the maintainability index for each of the applications. Although this information is shown in the form of a table, other manners of visualizing this data could be used.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

The invention claimed is:

1. A system for analyzing source code, the system comprising:
   one or more computers;
   a file reader module on at least one of the one or more computers to read an input source code file containing source code written in at least one computer programming language;
   a parser module on at least one of the one or more computers and including a plurality of parsers each specific to a different computer programming language, the parser module to parse the source code in the input source code file into source code components based on syntax rules of the at least one computer programming language in which the source code is written;
   a metrics accumulator module on at least one of the one or more computers to analyze the source code components according to one or more rules to generate application metadata; and a reporting engine on at least one of the one or more computers to generate a report based on the generated application metadata, the report comprising at least a visual comparison of a number of lines of code in the source code in a first one of the programming languages to a number of lines of code in the source code in a second one of the programming languages;

wherein the report includes a graphical representation of a number of lines of source code versus a complexity of the source code for a plurality of software applications.

2. The system of claim 1, further comprising a display monitor, wherein the reporting engine is configured to generate the graphical representation on the display monitor.

3. The system of claim 1, wherein the report is a first report, the system further comprising a display monitor, wherein the reporting engine is configured to generate a second report based on the generated application metadata, the report comprising at least a relevance of the source code of each of the plurality of software applications;

wherein the reporting engine to generate a graphical display on the display monitor of the first report and second report.

4. The system of claim 3, wherein the second report further includes an origin of the plurality of software applications, the origin of the plurality of software applications comprising an indication of whether each software application of the plurality of software applications is an in-house application, third party vendor application, or an off-the-shelf development application.

5. The system of claim 1, wherein the number of lines of code in the source code in the first one of the programming languages and the number of lines of code in the source code in the second one of the programming languages are expressed as percentages of the source code.

6. A computerized system for analyzing source code, the system comprising:

one or more computing devices including:
a processor, and
a memory having instructions stored therein which, when executed by the processor, cause the processor to:
read an input source code file containing source code written in at least one computer programming language;
parse the source code read from source code file into source code components;
analyze the source code components in accordance with one or more rules to generate application metadata; and
generate a report of the analysis from the generated application metadata, the report comprising (i) a plurality of applications, (ii) an origin of each of the plurality of applications, (iii) a language of each of the plurality of applications, (iv) a number of lines of source code of each of the plurality of applications, (v) a complexity of each of the plurality of applications, and (vi) a maintainability index for each of the applications.

7. The system of claim 6, wherein the instructions stored in the memory further include instructions which, when executed by the processor, cause the processor to parse the source code in accordance with the specific computer programming language in which the source code is written.

8. The system of claim 6, further comprising a display monitor, wherein the instructions stored in the memory further include instructions which, when executed by the processor, cause the processor to control the display monitor to display the report in the form of a graphical display.

9. The system of claim 6, further comprising a display monitor, wherein the instructions stored in the memory further include instructions which, when executed by the processor, cause the processor to control the display monitor to display the report in the form of a graphical display, the graphical display including the number of lines of source code versus the complexity of the source code for each of the plurality of applications.

10. The system of claim 6, further comprising a display monitor, wherein the report is a first report;
wherein the instructions stored in the memory further include instructions which, when executed by the processor, cause the processor to generate a second report of the analysis from the generated application metadata, the second report comprising at least a relevance of the source code to a software application and to control the display monitor to display the first report and the second report.

11. The system of claim 10,
wherein the second report further comprises an origin of the software application.

12. The system of claim 6, wherein maintainability index of each of the plurality of software applications is expressed as a percentage.

13. A method of analyzing source code, the method comprising:

reading with at least one computer an input source code file containing source code written in at least one computer programming language;
parsing with at least one computer the source code in the input source code file into source code components based on syntax rules of the at least one computer programming language in which the source code is written;
analyzing with at least one computer the source code components according to one or more rules to generate application metadata; and
generating with at least one computer a report based on the generated application metadata, the report comprising a graphical display of a number of lines of source code versus a complexity of the source code for a plurality of software applications.

14. The method of claim 13, wherein the complexity is cyclomatic.

15. The method of claim 13, wherein the report is a first report, further comprising generating with the at least one computer a second report based on the generated application metadata, wherein the second report comprises a graphical display of a relevance of the source code to the plurality of software applications.

16. The method of claim 15, wherein the second report includes an origin of each of the plurality of software applications.

17. The method of claim 16, wherein each origin of the plurality of software applications comprises in-house, third party vendor, or off-the-shelf development.

18. The method of claim 13, wherein the report comprises (i) a list of the plurality of software applications, (ii) an origin of each of the plurality of software applications, (iii) a language of each of the plurality of software applications, (iv) a number of lines of source code of each of the plurality of software applications, (v) a complexity of each of the plurality of software applications, and (vi) a maintainability index for each of the software applications.

* * * * *